Patented July 5, 1949

2,475,201

UNITED STATES PATENT OFFICE 2,475,201

PREPARATION OF TERPENE RESINS

Alfred L. Rummelsburg, Wilmington, Del., assignor to Hercules Powder Company, Wilmington, Del., a corporation of Delaware No Drawing. Application July 20, 1946,
Serial No. 685,243

12 Claims. (Cl. 260—619)

This invention relates to the process of preparing dihydroterpene-substituted phenols by condensing a dihydroterpene, having the empirical formula $C_{10}H_{18}$, with a phenol.

It is well known that terpenes having the empirical formula $C_{10}H_{16}$ may be condensed with phenols by means of various catalysts, as for example, inorganic acids such as sulfuric acid and phosphoric acid, organic acids such as paratoluene sulfonic acid, and metal halides such as aluminum trichloride and stannic chloride. However, the products resulting from the condensation of these terpenes with the phenol in the presence of these catalysts are mixtures in which terpene aryl ethers predominate, rather than terpene-substituted phenols.

Now in accordance with this invention it has been found that a dihydroterpene-substituted phenol may be produced by condensing a monocyclic dihydroterpene or a bicyclic dihydroterpene containing a cycloalkane ring of less than five carbon atoms, all of which have an empirical formula of $C_{10}H_{18}$, with a phenol in the presence of an activated siliceous material as a catalyst. This process has the advantage of resulting in a product which is essentially a dihydroterpene-substituted phenol and in addition has the advantage of easier operation since the catalyst may be removed by a simple filtration operation instead of the usual water-washing step required for the removal of the catalysts of the prior art.

The following examples are illustrative of the process in accordance with this invention. All parts and percentages are by weight unless otherwise indicated.

Example I

Pure dipentene (bromine number 240) was hydrogenated at 25°–29° C. at a hydrogen pressure of 33–58 pounds per square inch in the presence of 1.3% by weight of Raney nickel catalyst. The hydrogenation was continued for a period of about 8 hours at which time the hydrogen absorption was equivalent to about 108% of one double bond. The catalyst was removed by filtration and the resultant carvomenthene was found to have a bromine number of 112.

A mixture of 372 parts of phenol and 50 parts of Super Filtrol (trade name for an acid-washed montmorillonite clay), which had been calcined at 400° C. for 3 hours prior to use, was agitated at 140°–150° C. The above carvomenthene (380 parts) was added dropwise during about 2 hours to the agitated mixture which was held at about 150° C. Agitation was continued at that temperature for about 4 hours after which the mixture was filtered while hot to remove the catalyst. The unreacted constituents were removed by distillation up to a pot temperature of 200° C. at 10–20 mm. The crude menthylphenol (318 parts) which remained as a residue, crystallized on standing and was found to have a hydroxyl content of 6.9% (Zerewitinoff). The crude menthylphenol was purified by distillation, about 95% of the material distilling at a temperature of 170°–185° C. at 12 mm. The distillate was pale in color and crystallized immediately. The distilled menthylphenol (250 parts) had a melting point of 65°–85° C., a hydroxyl content of 7.1% (theory 7.3%) and a molecular weight of 235 (theory 232). The dark residue (about 54 parts) of noncrystalline resin which remained is believed to be the disubstitution product, dimenthylphenol, since it had a hydroxyl content of 4.7% (theory 4.6%) and a molecular weight of 366 (theory 369).

Example II

A mixture of 200 parts of phenol and 50 parts of Percol (trade name for an acid-washed montmorillonite clay), which had been calcined at 400° C. for 3 hours prior to use, was agitated at 140°–150° C. while adding 195 parts of carvomenthene (prepared as described in Example I). The reaction mixture was agitated at 140–150° C. for 3 hours and then was filtered to remove the catalyst. The unreacted constituents were removed by distillation up to a bath temperature of 184° C. at 12 mm. The residue of crude menthylphenol was a dark, viscous oil amounting to 211 parts. The crude product was distilled in vacuo at 1–2 mm. and the fraction boiling at 162°–178° C. was collected. This fraction amounted to 138 parts and was a pale liquid which immediately crystallized. The purified menthylphenol so obtained had a melting point of 66°–81° C., a hydroxyl content of 7.0% and a molecular weight of 228.

Example III

A by-product monocyclic terpene mixture obtained in the production of wood turpentine and containing about 60% dipentene (bromine number of 176) was catalytically hydrogenated in a continuous hydrogenation system using lump Raney nickel as catalyst, a temperature of about 137°–154° C., and a hydrogen pressure of 200–300 pounds per square inch. The crude carvomenthene obtained by this process had a bromine number of 92.

A mixture of 236 parts of phenol and 59 parts of a synthetic aluminum silicate catalyst was agitated at 150°–165° C. while adding 318 parts of the above crude carvomenthene. The reaction mixture was then agitated at 150°–165° C. for 3 hours, after which the catalyst was filtered from the reaction mixture while hot. The unreacted constituents were removed by distillation up to a pot temperature of 200° C. at 20 mm. The crude menthylphenol was then distilled in vacuo at 1–2 mm. and the fraction which boiled at a temperature of 120°–175° C. was collected. The purified menthylphenol, which was light yellow in color and crystallized on standing, amounted to about 151 parts. It had a molecular weight of 219 and a hydroxyl content of 6.3%.

*Example IV*

A by-product monocyclic terpene mixture from the production of wood turpentine and containing about 60% dipentene was hydrogenated at 71°–77° C. with a hydrogen pressure of 500–1000 pounds per square inch in the presence of 3% of a Raney nickel catalyst. The hydrogenation was continued until the bromine number of the material had been reduced from 178 to 87, after which the catalyst was removed by filtration.

A mixture of 247 parts of phenol and 68 parts of Magnesol (a synthetic magnesium silicate) was agitated at 160°–170° C. and 365 parts of the above crude carvomenthene were added during ¾ hour. Agitation was continued for about 3 hours at 160°–170° C., after which the reaction mixture was filtered while hot to remove the catalyst. The unreacted constituents were removed by distillation to a final pot temperature of 200° C. at 20–25 mm. pressure. The crude menthylphenol (72 parts) obtained as a residue was distilled at 1–3 mm. pressure and the product distilling over at a vapor temperature of 150°–216° C. was collected. The pale-colored distillate which amounted to 70 parts crystallized on standing.

*Example V*

Fifty-six parts of Super Filtrol (an acid-washed montmorillonite clay) were added to 374 parts of pure molten phenol and the mixture was heated to 170° C. At this temperature 505 parts of a crude carvomenthene, prepared as described in Example IV, were added over a period of 1½ hours with continuous and vigorous agitation. The reaction mixture was agitated at 170±5° C. for an additional 3-hour period and then was filtered while hot to remove the catalyst. The filtrate was distilled at 25–30 mm. pressure to a pot temperature of 200° C. to remove the unreacted materials. The residue which amounted to 462 parts of dark-colored menthylphenol was then distilled at 1 mm. pressure. The fraction which distilled at a vapor temperature of 150°–180° C. at 1 mm. pressure amounted to 402 parts and had a hydroxyl content of 6.7% (as determined by acetylation). About 95% of this fraction distilled in the range of 175°–180° C. The menthylphenol so obtained was a pale-colored viscous oil which crystallized on standing.

*Example VI*

Alpha-pinene was hydrogenated at a temperature of 120° C., with hydrogen at a pressure of 75 pounds per square inch in the presence of a Raney nickel catalyst. The pinane so produced had a boiling point of 168°–169° C. and a bromine number of 3.

A mixture of 250 parts of the above pinane, 250 parts of phenol, and 75 parts of Super Filtrol (an acid-washed montmorillonite clay) was heated in a shaking steel bomb for a period of 3 hours at 225° C. After cooling to room temperature, the reaction mixture was filtered to remove the catalyst. The unreacted constituents were removed by distilling up to a final bath temperature of 195° C. at a pressure of 15 mm. The residue, which was a viscous liquid was then distilled at a pressure of 2–3 mm. About 92% of the material distilled at a temperature of 140°–170° C. at 2–3 mm. The product, which was a pale-colored liquid, had a hydroxyl content of 6.7% (Zerewitinoff) or 6.8% (acetylation) and a molecular weight of 232 (Rast).

*Example VII*

A mixture of 350 parts of o-cresol and 50 parts of Super Filtrol (an acid-washed montmorillonite clay) was agitated at 160° C. About 300 parts of carvomenthene (prepared as described in Example I) were added during ½ hour to the agitated mixture which was held at 160°–170° C. Agitation was continued at that temperature for about 8 hours, after which the mixture was filtered while hot to remove the catalyst. The unreacted constituents were removed by distillation up to a pot temperature of 215° C. at 10–15 mm. The crude menthylcresol which remained as a residue (about 150 parts) was a viscous liquid which had a hydroxyl content of 6.4% (Zerewitinoff).

In carrying out the reaction in accordance with this invention any activated siliceous material may be used as the catalyst for condensing the phenol with the dihydroterpene. Activated siliceous catalysts which may be used are, for example, magnesium silicate such as those sold under the trade name of Magnesols, calcium silicate, synthetic aluminum silicates, silica gel, infusorial earths and other activated siliceous earths and minerals such as fuller's earth and Florida earth, commercial acid-treated montmorillonite-type of minerals such as those sold under the trade names of Percols, Filtrols and Super Filtrols. If desired the catalysts may be calcined at temperatures of about 200°–400° C. prior to their use, in order to render them more effective. The catalysts may be used in a powdered, granulated or pelleted form.

The condensation in accordance with this invention may be carried out on a batchwise or continuous scale. Thus, on a batchwise scale the reactants may be mixed and heated with agitation in the presence of the catalyst for periods of from about ½ to about 12 hours or more, and preferably from about 1 to about 3 hours, at temperatures of from about 125° C. to 300° C., and preferably from about 150° C. to 250° C. The catalyst is readily removed by means of filtration and the excess phenol and the unreacted dihydroterpene may then be removed by means of distillation, desirably using reduced pressure. When reaction temperatures above the boiling points of the dihydroterpene and phenol are utilized, a closed system such as a suitable autoclave or bomb can be utilized. The condensation may be carried out on a continuous scale, by passing the reactants over the granular, supported or pelleted catalyst in a tube or column either in the vapor or liquid phase and using either atmospheric or superatmospheric pressures.

In carrying out the reaction of the present invention, it is usually desirable to employ at least one mole of phenol for each mole of dihydroterpene being reacted. Under these conditions, the introduction of one dihydroterpene substituent will, in general, predominate as, for example, in the preparation of menthylphenols from menthenes. However, by utilizing more than one mole of dihydroterpene for each mole of phenol the introduction of more than one dihydroterpene substituent can be accomplished to some extent. Under these conditions complex-substituted phenols sometimes also result which can also contain condensates of the polymers of dihydroterpenes with phenols. While any ratio of phenol to dihydroterpene may be used, it is preferable to use about 0.75 to about 3 moles of phenol for each mole of dihydroterpene.

Any phenol may be employed in accordance with the reaction of the present invention. Typical phenols which may be used are phenol, cresols, tert-butylphenols, amylphenols, dialkylhydroxybenzenes, monochlorophenols, nitrophenols, dihydroxybenzenes such as resorcinol and pyrocatechol, mono- and di-hydroxynaphthalenes, mono- and di-hydroxyanthracenes, mono- and di-hydroxydiphenyls, pyrogallol, phloroglucinol, 2,2-bis(p-hydroxyphenyl)propane, guaiacol, etc.

Any monocyclic dihydroterpene or bicyclic dihydroterpene containing a cycloalkane ring of less than five carbon atoms may be used in accordance with the reaction of the present invention. By dihydroterpene is meant a hydrogenated terpene which has the empirical formula $C_{10}H_{18}$. Thus the monocyclic dihydroterpenes having an empirical formula of $C_{10}H_{18}$ contain one double bond. Suitable monocyclic dihydroterpenes are the para-menthenes, such as 1-para-menthene, 2-para-menthene, 3-para-menthene, 1(7)-para-menthene, 4(8)-para-menthene, and 8-para-menthene, as well as dihydropyronenes. The para-menthenes may be obtained by the selective catalytic hydrogenation of dipentene or by the dehydration of dihydroterpineols. When the menthenes are prepared by the hydrogenation of the exocyclic double bond in substantially pure dipentene, it is desirable that this hydrogenation be carried out to the extent of about 105% to about 110% of one double bond in order to obtain the most desirable result. The resulting product will then contain about 80% to about 90% of the desired menthene. The para-menthene-type of dihydroterpenes may also be conveniently produced by hydrogenating crude dipentene in a suitable closed system using a hydrogenation pressure of about 25 to about 2000 pounds per square inch and temperatures between about 25° C. and about 200° C. in the presence of a suitable hydrogenation catalyst. Monocyclic dihydroterpenes containing one double bond may also be formed by means of liquid or vapor phase thermo or catalytic isomerization of dihydropinene (pinane).

The bicyclic dihydroterpenes which are operable in accordance with this invention are those containing a cycloalkane ring of less than five carbon atoms, i. e. those which contain a cyclopropane ring such as carane and thujane, or which contain a cyclobutane ring such as pinane. Those bicyclic dihydroterpenes containing a cycloalkane ring of five carbon atoms such as camphane, isocamphane, fenchane, and isobornylane are not operable in the process of this invention. Pinane may be obtained by the catalytic hydrogenation of pinenes and thujane and carane by the catalytic hydrogenation of thujenes, carenes and sabinene.

In carrying out the reaction of the present invention an inert solvent may be used to reduce the viscosity of the reaction mixture if desired. Suitable solvents that may be used are benzene, toluene, xylene, gasoline, cyclohexane, etc.

In carrying out the reaction in accordance with this invention utilizing an activated siliceous material as catalyst, the catalyst can readily be removed from the reaction mixture by means of a simple filtration operation. The unreacted constituents and/or solvent may then be removed by distillation and the menthylphenol remaining as a residue may be purified by distillation in vacuo or by recrystallization from a suitable solvent. By utilizing activated siliceous catalysts the water-washing step which is required to remove the catalysts used in the prior art processes may be eliminated.

Since the water-washing step necessary to remove the prior art catalysts also removed at least part of the unreacted phenol, this phenol had to be recovered from the water-wash by a separate operation. However, the process in accordance with this invention greatly simplifies operations and, as a result, reduces the cost of the product. The removal of the catalyst by filtration saves time and labor and the unreacted phenol is directly recovered in the distillation of the unreacted constituents from the reaction mixture.

The products obtained by this reaction consist essentially in substituted phenols. When phenol itself is condensed with the dihydroterpene according to the present invention the product is a monosubstituted phenol containing a relatively smaller amount of disubstituted phenol. These may be separated from each other by vacuum distillation. The proportions of these reaction products can be varied somewhat by controlling the amount of excess phenol utilized, as pointed out above, as well as by the control of temperature and reaction time. When the dihydroterpene is condensed with a substituted phenol, a longer reaction period is generally required and the products are often more complex in nature.

The dihydroterpene-substituted phenols prepared in accordance with this invention are useful in preparing synthetic resins by means of their condensation with aldehydes and other organic chemicals. The resulting resins are particularly stable because the dihydroterpene-substituted phenol is fully saturated.

What I claim and desire to protect by Letters Patent is:

1. The process of preparing a dihydroterpene-substituted phenol which comprises reacting a dihydroterpene and a phenol in the presence of an activated siliceous catalyst, the dihydroterpene being selected from the group consisting of monocyclic dihydroterpenes and the bicyclic dihydroterpenes which contain a cycoalkane ring of less than five carbon atoms.

2. The process of preparing a dihydroterpene-substituted phenol which comprises reacting a monocyclic dihydroterpene having the formula $C_{10}H_{18}$, with a phenol in the presence of an activated siliceous catalyst.

3. The process of preparing a dihydroterpene-substituted phenol which comprises reacting a bicyclic dihydroterpene containing a cycloalkane ring of less than five carbon atoms with a phenol in the presence of an activated siliceous catalyst.

4. The process of preparing a dihydroterpene-substituted phenol which comprises reacting a terpenic composition containing essentially monocyclic dihydroterpenes with a phenol in the presence of an activated siliceous catalyst.

5. The process of preparing a menthylphenol which comprises reacting a menthene with a phenol in the presence of an activated siliceous catalyst.

6. The process of preparing a menthylphenol which comprises reacting a para-menthene with a phenol in the presence of an activated siliceous catalyst.

7. The process of preparing a dihydroterpene-substituted phenol which comprises reacting pinane with a phenol in the presence of an activated siliceous catalyst.

8. The process of preparing a menthylphenol which comprises reacting a para-menthene with phenol in the presence of an activated siliceous catalyst.

9. The process of preparing a dihydroterpene-substituted phenol which comprises reacting pinane with phenol in the presence of an activated siliceous catalyst.

10. The process of preparing a dihydroterpene-substituted phenol which comprises reacting a para-menthene having an exocyclic double bond with a phenol in the presence of an activated siliceous catalyst.

11. The process of preparing a dihydroterpene-substituted phenol which comprises reacting 2-para-menthene with a phenol in the presence of an activated siliceous catalyst.

12. The process of preparing a dihydroterpene-substituted phenol which comprises reacting 3-para-menthene with a phenol in the presence of an activated siliceous catalyst.

ALFRED L. RUMMELSBURG.

REFERENCES CITED

The following references are of record in the file of this patent:

UNITED STATES PATENTS

| Number | Name | Date |
|---|---|---|
| 1,917,823 | Britton et al. | July 11, 1933 |

OTHER REFERENCES

Arbuzov et al., Chemical Abstracts, vol. 34, col. 2497 (1904).

Simonsen, "The Terpenes," vol. I, (1931), Cambridge, Univ. Press, page 133.